United States Patent [19]

Inoue et al.

[11] 3,907,566

[45] Sept. 23, 1975

[54] PHOTOSENSITIVE MATERIAL CONTAINING INORGANIC COMPOUND COATED METAL PARTICLES AND THE USE THEREOF IN PHOTOGRAPHIC DEVELOPMENT PROCESSES

[75] Inventors: Eiichi Inoue, Tokyo; Isamu Shimizu, Fuchu; Hiraku Sakuma, Musashino; Hiroshi Kokado, Tokyo, all of Japan

[73] Assignee: Canon Kabushiki Kaisha, Tokyo, Japan

[22] Filed: July 20, 1972

[21] Appl. No.: 273,407

[30] Foreign Application Priority Data

July 23, 1971 Japan .............................. 46-55111

[52] U.S. Cl. ...................... 96/48 R; 96/1.5; 96/1.8; 96/88; 96/48 PD; 96/48 QP; 96/36.2; 96/35; 96/36; 252/50 L; 117/100 B

[51] Int. Cl. .......................... G03c 1/00; G03c 5/24

[58] Field of Search ............ 96/88, 1.5, 1.8, 48 PD, 96/48 R, 48 QP, 35, 36, 36.2; 252/50 L; 117/100 B

[56] References Cited

UNITED STATES PATENTS

| | | | |
|---|---|---|---|
| 2,600,343 | 6/1952 | Tuttle | 96/36.2 |
| 3,031,344 | 4/1962 | Sher et al. | 117/100 B |
| 3,469,898 | 9/1969 | Altman | 117/100 B |
| 3,647,430 | 3/1972 | Hanada et al. | 252/50 L |
| 3,658,540 | 4/1972 | Malinowski | 96/48 PD |
| 3,707,372 | 12/1972 | Hallman et al. | 96/36.2 |

*Primary Examiner*—Norman G. Torchin
*Assistant Examiner*—Won H. Louie, Jr.
*Attorney, Agent, or Firm*—Fitzpatrick, Cella, Harper & Scinto

[57] ABSTRACT

Photosensitive member employing an inorganic compound capable of photooxidizing a metal and a metal capable of diffusing into the inorganic compound by photooxidation, comprises a photosensitive layer containing uniformly a photosensitive particles composed of particle of the inorganic compound and a metal selected from the group consisting of Ag, Cu, and alloy containing Ag, Cu or both of Ag and Cu, attached to the surface of the inorganic compound particle.

10 Claims, No Drawings

PHOTOSENSITIVE MATERIAL CONTAINING INORGANIC COMPOUND COATED METAL PARTICLES AND THE USE THEREOF IN PHOTOGRAPHIC DEVELOPMENT PROCESSES

BACKGROUND OF THE INVENTION:

1. Field of the Invention

This invention relates to a novel photosensitive material.

2. Description of the Prior Art

When a photosensitive member composed of a metal layer and a chalcogen glass layer is exposed to a light, the metal diffuses into the chalcogen glass layer at the exposed portion at a scale of molecular level to form a diffusion layer. In the diffusion layer there is formed a substance different from any of the metal and the chalcogen glass and this substance thus formed has chemical and physical properties different from those of the metal layer and the chalcogen glass layer. With respect to the difference of physical properties, there are caused lowering of optical density, lowering of electric resistance, increase in photoconductivity, dependency of photoelectric motivation and electric resistance upon voltage (so called switching phenomenon or memory phenomenon) and change of other various physical properties.

Further, with respect to chemical changes, there are caused changes of acid resistance, alkali elution and crystallization. Those changes of physical and chemical properties are valuable as a photosensitive material from commercial point of view.

Heretofore, such kind of photosensitive member as above are usually composed of a chalcogen glass layer and a metal layer. This lamination has been generally conducted by vapor-depositing under vacuum and the layers are thin.

The lamination type of photosensitive member has been produced by vapor-depositing a chalcogen glass layer on a base and then a metal layer on the chalcogen glass layer, or vice versa. During the vapor-depositing procedure there is caused, at a various degree, diffusion of the metal and the chalcogen glass, that is, exposure, by a radiation from the vapor source or a radiation generated by the molted state of the vapor-depositing material itself. Particularly, when the combination of metal and chalcogen glass can give a highly sensitive photosensitive material, such exposure during vapor-depositing is remarkable. Accordingly, highly sensitive material can not be employed in the preparation of the lamination type photosensitive material.

The sensitivity (degree of mutual diffusion) of photosensitive material is dependent upon the combination of chalcogen glass and metal, but not upon each individual one. For example, a combination of $As_2Te_3$ and Ag causes mutual diffusion during vapor-depositing and the use of the resulting photosensitive material is hindered. On the contrary, a combination of $As_2Te_3$ and Mn does not cause mutual diffusion during vapor-depositing to give a photosensitive material of a desirable sensitivity. In general, a combination of a metal and a chalcogne glass containing Se or Te has a tendency of giving high sensitivity. Further, addition of halogen or thalium often results in increase of sensitivity.

When the melting point of a metal is higher than 400°C, a temperature of the vapor source should be usually elevated to higher than 500°C for vapor-depositing and the vapor-depositing procedure is usually effected for a long time in a state of much thermal radiation. Consequently, the irradiation energy falling within the spectral sensitivity range of the photosensitive material exceeds $10^3$erg/cm$^2$. This radiation energy of $10^3$erg/cm$^2$ corresponds to the lowest level of sensitivity of a highly sensitive photosensitive member. Among photosensitive members essentially composed of a metal layer and a chalcogen glass, commercially valuable and widely used photosensitive members usually start diffusion of the metal, i.e. exposure, by irradiation of a radiation energy of $10^3$ erg/cm$^2$. On the contrary, a photosensitive material not sensitive to this energy level can not be classified into a group of highly sensitive photosensitive material.

Conventional lamination type fails to provide a flexible photosensitive member in view of its structure. Conventional lamination type of photosensitive member necessitates uniformity of surface and thickness and extremely thin layer structure and therefore, vapor-depositing conditions are strict and complicated and it is difficult to produce commercially and economically large amount of such photosensitive member.

In a photosensitive member functioning due to diffusion effect of a metal and a chalcogen glass, the amouont of metal may be of a catalytic amount as compared with the amount of chalcogen glass, but a considerable amount of metal is vapor-deposited for producing a uniform layer in the lamination type. Therefore, the lamination type is disadvantageous from manufacturing technique and economical point of view.

Among substances reacting photochemically with a metal and into which the metal diffuses, there are included crystalline materials having no glass transition point such as metal halides, metal sulfides and metal selenides, for example, halides, sulfides and selenides of Cu, Pb, Ca and Zn, other than chalcogen glass. These metal compounds also have the same disadvantages as in chalcogen glass.

SUMMARY OF THE INVENTION

According to the present invention, there is provided a photosensitive member employing an inorganic compound capable of photooxidizing a metal and a metal capable of diffusing into the inorganic compound by photooxidation, which comprises a photosensitive layer containing uniformly a photosensitive particles composed of particle of the inorganic compound and a metal selected from the group consisting of Ag, Cu, and alloy containing Ag, Cu or both of Ag and Cu, attached to the surface of the inorganic compound particle.

An object of this invention is to provide a photosensitive member solving the above-mentioned disadvantages of conventional photosensitive members.

Another object of this invention is to provide a method for forming a pattern by using a pattern by using the photosensitive member.

DESCRIPTION OF THE PREFERRED EMBODIMENTS

The photosensitive particles may be prepared by attaching Ag, Cu or an alloy thereof to a particle of the inorganic compound. The particles of the inorganic compound may be produced by conventional manufacturing techniques such as melting a mixture of elements in a furnace followed by cooling and grinding. As methods of attaching a metal to the surface of the inorganic compound particle, there may be employed various physical and chemical means. For example, a metal may be coated on the inorganic compound particle by vapor-depositing. However, depositing of metal from a liquid phase is far more preferred. Inorganic compound particles are suspended in a liquid and Ag or Cu ion and, if desired, a reducing agent are added to the liquid to deposit a metal film on the particles of inorganic compound.

Particle surface of most inorganic compound shows reducing effect when the surface is new. Therefore, as soon as the added Ag or Cu ions contact the surface of the inorganic compound, the ion is immediately reduced to deposit on and coat the surface of the inorganic compound. Further, in most cases, the presence of an inorganic or organic reducing agent facilitates smooth reducing depositing.

As the reducing agent, a reducing agent of mild activity is preferred. Representative reducing agents of mild activity are inorganic reducing agents such as ferrous ion, (e.g. ferrous sulfate), sulfite ion, hydrazines and hydroxyl amines, and organic reducing agents such as polyhydric phenols, e.g. hydroquinone and pyrogallol, aminophenols such as 1-methylamino-pheol, and ascorbic acid.

Examples of preparing photosensitive particles are shown below.

Preparation Example 1

Ten grams of $As_2S_3$ powder was ground by a ballmill with 300ml. of water for three hours. Nitrogen gas was introduced into the resulting emulsion with stirring using an efficient stirrer, and 10ml. of 5 percent solution of silver nitrate was added to it and thereafter was stirred for three hours. After centrifugal separation, the particles were recovered and then washed sufficiently with water.

The resultant photosensitive particles included the following amount of silver.

Analysis value of silver: 3.8mg per 1.0g of $As_2S_3$

Preparation Example 2

Ten grams of $As_2S_3$ powder was ground by a ballmill in a way similar to Preparation Example 1. Ten grams of hydroquinone was added to the resulting emulsion with stirring and aqueous ammonia was added until pH of the said solution reached 8.5. Ten ml. of 1% silver nitrate solution was added dropwise while maintaining pH at about 8.5 - 9.0 by adding aqueous ammonia. After addition of the silver nitrate solution, the emulsion was stirred for 30 minutes, precipitated by centrifugal separator and the resultant particles were washed with water.

The resultant photosensitive particles contained the following amount of silver.

Analysis value of silver: 7.0mg per 10g of $As_2S_3$

Various inorganic compounds were treated by the methods as mentioned above, and the following results were obtained.

| No. of sample | Inorganic compounds | Ag. mg/g. of inorganic comp. |
|---|---|---|
| 1 | $AS_{2.5}\ S_{3.8}$ | 12.0 |
| 2 | $AS_{2.5}\ S_{3.0}\ Se_{1.0}$ | 5.0 |
| 3 | $As_{2.5}\ S_{2.0}\ Se_{2.0}$ | 7.0 |
| 4 | $As_{2.5}\ Te_{2.5}$ | 7.0 |

-Continued

| No. of sample | Inorganic compounds | Ag. mg/g. of inorganic comp. |
|---|---|---|
| 5 | $As_{2.5}\ Be_{2.5}\ Te_{1.0}$ | 7.0 |
| 6 | $PbI_2$ | 20.0 |
| 7 | PbS | 12.0 |
| 8 | CuI | 28.0 |
| 9 | $Cdcl_2$ | 13.0 |

Preparation Example 3

Ten grams of $As_2S_3$ powder was ground by a ballmill, dispersed in 300ml. of water, and dipped in Fehling's solution. A 1% aquous solution of glucose was added and shaking occasionaly. After an hour, the precipitate was washed with water and dried. The resultant photosensitive particles contained the following amount of copper.

Analysis of copper: 15 mg per 1 g of $As_2S_3$.

Formation of metal coating on the inorganic compound particles is generally effected prior to the shaping of the photosensitive layer. Alternatively, the inorganic compound particles are dispersed in a hydrophilic binder resin such as gelatine and casein and a solution of metallic ion as obtained in Preparation Examples 1–3 is added to the resulting resin dispersion liquid to deposit the metal of the inorganic compound particles. In this case, the resin dispersion thus obtained may be directly applied to the surface of a support to form a photosensitive layer. Further example is that a layer composed of the inorganic compound particles dispersed in a hydrophilic binder resin is provided on a support and soaked in a solution of metallic ion as shown in Preparation Examples 1–3 to attach the metal to the inorganic compound particles. In such a case, the photosensitive layer is directly formed after soaking. The hydrophilic binder resin allows the metallic ion to penetrate therein.

When the inorganic compound is a chalcogen glass, the photosensitive layer may be formed by other procedures. The chalcogen glass is dissolved in an alkali solution of a hydrophilic binder resin and then an acid is added to the alkali solution. As the neutralization of the alkali solution with the acid proceeds, the chalcogen glass separates in a form of particle and the resulting chlcogen glass particles are dispersed in a hydrophilic binder resin. The resulting dispersion is treated with a solution containing metallic ion as shown in Examples 1–3 to form photosensitive particles dispersed in the hydrophilic binder resin.

In such procedure, as above, when the treatment with a solution containing metallic ion is applied to a hydrophilic binder resin film formed on a support and containing dispersed chalcogen glass particles, a photosensitive layer is directly produced on the support.

According to further alternative method, a precursor capable of forming a chalcogen glass by reaction with a specified compound is dissolved in a hydrophilic binder resin and said specified compound is added thereto to separate chalcogen glass particles followed by treating with a solution containing a metallic ion to deposit the metal on the surface of chalcogen glass particles thereby giving photosensitive particles. In this case, if the hydrophilic binder resin containing dispersed chalcogen glass particles is formed as a film on a support followed by treating with a solution containing metallic ion to produce directly a photosensitive layer. Chalcogen glass particles may be precipitated, for example, by a reaction of $AsCl_3$ with $H_2S$ gas or $Na_2S$ resulting in formation of $As_2S_3$. The form of the photosensitive layer is usually a binder resin in which the photosensitive particles are dispersed.

Another form is such that a photosensitive layer is formed with the photosensitive particles alone. For example, the photosensitive particles are tightly packed in a particular case to form a photosensitive layer, or the photosensitive particles are placed on a support at an appropriate thickness to form a photosensitive layer and then a protective layer is provided thereon to fix the photosensitive particles. As the protective film, there may be employed an appropriate resin film. The resin protective film may be formed on a photosensitive layer by producing a coating film with a resin solution.

According to still another method, the photosensitive particles are scattered on a support such as inert metal, for example, chromium and glass and heated to melt and adhere the photosensitive particles onto the support. This method is particularly advantageous for a chalcogen glass containing halogen of low melting point. In this case, a self-supporting form of photosensitive particles may be produced by empoying a chalcogen glass and a support to which the chalcogen glass hardly adheres and melting the photosensitive particles to bind them followed by releasing the photosensitive particles thus bound from the support.

As far as the function of the photosensitive member of the present invention is concerned, only a minor amount of metal film piece attached to the inorganic compound particles is sufficient. Further, the ratio of metal to chalcogen glass may be optionally adjusted at the step of coating a metal film. In usual, an extremely small amount of metal per unit is sufficient as compared with a photosensitive member of lamination type. It is not necessary that the attaching of the metal to the inorganic compound particles is microscopically uniform and therefore, any higher technique is not required.

Since the photosensitive member of the present invention is an aggregation of photosensitive units composed of photosensitive particles, the photosensitivity is markedly enhanced. As compared with a lamination type, the surface area of the interface is increased to a great extent and the diffusion is effected to all directions. Therefore, the photosensitivity is most enhanced when the photosensitive layer is composed of the photosensitive particles alone.

The inorganic compounds constituting photosensitive particles have the function changing Ag or Cu to $Ag^+$ or $Cu^+$ by photooxidation, and $Ag^+$ or $Cu^+$ diffuses into the said compounds. Therefore, photosensitive particles have photosensitivity eliminating $Ag^+$ or $Cu^+$ when exposed to light. The inorganic compounds include a chalcogen glass and a metal compound. The metal compound may be oxides, halides, sulfides, selenides, arsenides, telluride of Cu, Zn, Cd, Hg, Ga, In, Tl, Pb, Sn, Sb and Bi, and intermetallic compounds of the above metals.

A chalcogen glass is an amorphous material containing at least one of sulfur group elements (S, Se and Te), and the representative examples used in the present invention are binary chalcogen glass such as As-Se system, Ge-S system, S-Si system, Se-S system, Se-Te system, Sb-Se system, Sb-Te system, Bi-Se system, Bi-S system, Ge-S system, Bi-Te system and the like; ternary chalcogen glass such as As-S-Te system, As-Se-Te system, Sb-As-S system, As-S-Se system, As-S Ge system, S-Se-Ge system, As-Se-Ge system and the like, and quaternary chalcogen glass such as As-S-Se-Te system, As-S-Se-Ge system and the like.

Sometimes, an element such as halogen, Ge and Si is added to the chalcogen glass as an activator.

The useful metal compounds are crystallized metal compounds having photoconductivity such as CuI, $PbI_2$, $PbCl_2$, $CdCl_2$, CuCl, $SbI_3$, PbS, CdS, AnS, PbSe, CdTe, GaAs, InAs, ZnO, InSb and the like.

The metal coating a photosensitive particles is Ag or Cu or alloys including Ag and/or Cu. The alloys having low melting point are very useful, for example, Ag-Bi (Bi more than 80 percent), Ag-Cd (Cd more than 95 percent),
Ag-Ga (Ga more than 55 percent), Ag-Hg (Hg 90–95 percent),
Ag-In (In more than 70 percent), Ag-Li (Li more than 9 percent),
Ag-Pb (Pb more than 98 percent), Ag-Te (Te 62–86 percent),
Ag-Tl (Tl more than 92 percent), Cu-Ga (Ga more than 87 percent),
Cu-Hg (Hg more than about 95 percent), Cu-In (In more than 95 percent),
Cu-Sn (Sn more than 93 percent) and Cu-Te (Te 78–86 percent).

Photosensitive particles may be dispersed in a binder resin by any of conventional methods such as ball-mill, a high speed blender and the like.

The photosensitive layer thus produced may form a self-supporting member by setting the thickness to a thick level or a photosensitive member compound of a photosensitive layer overlying a support.

The photosensitive member according to the present invention may be produced without using high temperature heating and therefore, there may be optionally used a starting material capable of forming highly sensitive material such as chalcogen glasses of As-S-Se, As-S-Te, As-Se, As-Te, and As-Se-Te systems.

Furthermore, the photosensitive member according to the present invention may be easily prepared at low cost as compared with a lamination type, and this favors commercial mass production thereof. It is not necessary in the present invention that all of the surface of the inorganic compound particles are coated by the metal, but only a partial coating of the metal on the inorganic compound particles is sufficient.

The binder resin used in the present invention may be hydrophilic or oleophilic. In case that a fixing treatment is necessary, as mentioned later, a hydrophilic binder resin is used.

As the oleophilic binder resin, there may be mentioned polystyrene, polyvinyl butyral, polyvinyl acetate, polyvinyl chloride, polyvinylidene chloride, cellulose acetate, nitrocellulose, ethylcellulose, and the like. As the hydrophilic binder resin, there may be mentioned gelatin, casein, hydroxy ethylcellulose, ethylcellulose, polyvinyl alcohol and the like.

The composition ratio of the photosensitive particles is appropriately selected depending upon use of the pattern to be formed. In general, 0.01–50 parts by weight of metal is preferably used for 100 parts by weight of the photosensitive particle.

Particle size of the photosensitive particles is selected depending upon the resolving power required in each usage of the photosensitive member. In general, the particle size preferably ranges from 0.01 to 20 microns. The thickness of the photosensitive layer is not critical, but preferably ranges from 3 to 50 microns. As a ray for exposure, there may be used ultraviolet ray, visible light, near infrared ray, and further corpuscular beam such as electron beam and ion beam.

When the photosensitive particles are dispersed in a binder resin, 0.1–300 parts by weight of photosensitive particle is preferably used for 100 parts of a binder resin from photosensitivity point of view.

The photosensitive member of the present invention can form various kinds of pattern only by pattern exposure. The photosensitive member produces a color change at the exposed portion to form a visible image and thereby, it can be used as a recording material. Since electric resistance decreases at the exposed portion, the photosensitive member can be used for producing various resistance pattern. Photoconductivity at the exposed portion is increased so that the photosensitive member can be used for forming various photoconductive pattern. Furthermore the resistance-voltage dependency (so called switching phenomenon or memory phenomenon) varies to a great extent and thereby the photosensitive member can be used as various memory elements. The utilization of the photosensitive member as a means for pattern formation is particularly effective when the photosensitive member is composed only of photosensitive particles.

All of the various structures of photosensitive layer as mentioned previously can be used in the process of forming patterns only by pattern exposure.

Patterns produced by pattern exposure may be converted to other patterns by subsequent treatments following the pattern exposure.

For example, after pattern exposure, the pattern is subjected to a physical development to convert the resulting pattern to a pattern of high contrast. At the exposed portion of the photosensitive layer, the metal attached to a surface of of the inorganic compound contributes to diffusion and thereby, is consumed. On the contrary, the metal remaining at unexposed portion behaves as a development nucleus upon physical development and silver is deposited thereon. As a result, the optical density at the unexposed portion is increased and the contrast is enhanced to form a positive pattern. Application of physical development after pattern exposure gives more effective result when the photosensitive particles are dispersed in the hydrophilic binder resin because the silver ion penetrates the hydrophilic binder resin to deposit even on the remaining metal present inner portion thereof. When the photosensitive layer comprises the photosensitive particles dispersed in an oleophilic binder resin or the photosensitive layer is composed of only the photosensitive particles, the efficiency of physical development is low since the concentration of the metal exposed on the surface is low.

The pattern formed by the physical development treatment may be fixed by an alkaline treatment. When the inorganic compound particles of the photosensitive particles are chalcogen glass dissolved by an alkali, the photosensitive layer may be treated with an alkaline solution to dissolve and remove the chalcogen glass particles at the unexposed portions. The metal (including, for example, Ag deposited upon physical development) attached to the chalcogen glass remains in the photosensitive layer and only chalcogen glass is dissolved out through the gaps among the attached metal particles. On the contrary, the chalcogen glass particles at the exposed portion contain the metal particles (for example, Ag and Cu) diffused thereinto and is difficulty soluble in alkali. Therefore, the alkali treatment gives a pattern fixed by dissolving and removing the chalcogen glass particles at the unexposed portion.

The conversion of pattern formed by pattern exposure can be effected by an acid treatment. In this case, the resulting patterns are different from each other depending upon the type of the inorganic compound dispersed in the hydrophilic binder resin. When the inorganic compound is chalcogen glass, the acid treatment after pattern exposure dissolves and removes the metal attached to the photosensitive particles at the unexposed portion to form a fixed pattern. In the resulting pattern, the metal is not or is hardly present at the unexposed portion while at the exposed portion there remain chalcogen glass particles containing the metal diffused thereinto, and therefore, the resulting pattern is a negative pattern. The resulting negative pattern may be subjected to an alkali treatment to dissolve and remove selectively the unexposed chalcogen glass for the purpose of enhancing the contrast. On the contrary, when the photosensitive material is a metal compound, the acid treatment after pattern exposure results in dissolving and removing preferentially the metal compound particles containing the metal diffused thereinto at the exposed portion which is more soluble in an acid and thereby a positive pattern is formed.

As a method of converting a pattern formed by pattern exposure, there may be used an alkali treatment after pattern exposure. The alkali treatment is used when the inorganic compound composing the photosensitive particles is alkali-soluble. After applying a light pattern projection to a photosensitive layer composed of a hydrophilic binder resin containing dispersed photosensitive particles, the resulting pattern is treated with a solution of alkali to dissolve the inorganic compound particles at the unexposed portion leaving the metal to give a fixed pattern. After alkali treatment, a physical development may be applied thereto to convert further the pattern. As the result of physical development, Ag deposits on the remaining metal at the unexposed portion as a development nucleus. At the exposed portion, the metal is diffused into the inorganic particles and therefore, Ag does not deposit on the exposed portion. As the result, a positive pattern of enhanced contrast is obtained.

When the photosensitive layer is composed of photosensitive particles dispersed in a photoresist resin as a binder resin, a pattern can be obtained by etching and removing the exposed or unexposed portion with a photoresist etching agent after pattern exposure. In this case, only the exposed or unexposed portion forms pattern. It depends on the type of photoresist used which of the exposed or unexposed pattern is removed.

Representative photoresists are KPR (Kodak Photo Resist), KMER (KODAK Metal Etch Resist), TPR (a photoresist supplied by Tokyo Oyo Kagaku), SHIPLEY AZ 1350 (trade name, supplied by Shipley Co.) and KTFR (Kodak Thin Film Resist). Removing and dissolving the photoresist at the unexposed portion may be conducted with tricklene, methylene chloride, AZ Remover (trade name, supplied by Shipley) and hot concentrated sulfuric acid. When a photoresist is used as a binder resin, so called reverse-photoresist may be used and the exposed portion of the photosensitive layer is removed, and if desired optical density at the unexposed portion can be enhanced by physical development.

The pattern obtained by using the photosensitive member of the present invention may be used as photomask, resistance pattern, electric circuit element and others as well as record pattern.

An alkaline solution used for forming a pattern may be usually. An aqueous of alcoholic solution of alkali metal hydroxide such as lithium, sodium and potassium hydroxides or organic alkali such as piperidine. The pH of the alkaline solution is preferably not higher than 13.

As an acid solution for removing the metal, there may be used a chromic acid mixture ($K_2Cr_2O_7$—$H_2SO_4$), a mixture of copper sulfate and sulfuric acid ($CuSO_4$—$H_2SO_4$), a solution of ferric nitrate, and a solution of potassium ferricyanide and potassium bromide (subsequently applying a solution of sodium thiosulfate) for Ag and Cu, and a solution of ferric chloride for Cu.

Further, the metal at the unexposed portion may be treated with $H_2S$ or $H_2O_2$ to convert the metal to a sulfide or oxide to passivate for fixing the pattern. The treatment with an acid or alkali solution can be effectively applied through the hydrophilic binder resin.

The following examples are given for illustrating the present invention, but not for limiting the present invention.

EXAMPLE 1

Ten grams of $As_2S_3$ powder coated by silver which was made in Preparation Example 1 above was dispersed in 100 ml. of a 5 percent gelatine solution by a ballmill. The dispersed solution was coated on a glass plate in thickness of 10 microns (after dried), cooled (to) set gelatine, and thereafter dried by air of up to 50°C.

The above glass plate was closely contacted with a negative original and exposed to a high pressure mercury light (500 W) for five minutes at a distance of 30 cm. The optical density was 0.12 at the exposed portion and 2.3 at the unexposed portion. Silver on the unexposed of the said plate portion was removed by dipping in a 20 percent solution of ferric nitrate for 30 seconds, and then washed with water and dried to produce a dark brown image at the exposed portion. D max was 1.2 and the density of back ground was 0.7 (measured by using a yellow filter).

The chalcogen powders on the unexposured portion was dissolved and removed by dipping in a 3 percent aqueous solution of sodium hydroxide for three minutes followed by washing and drying, and as the result, density of the back ground was decreased to 0.10, but D max was hardly affected.

EXAMPLE 2

One gram of $As_2S_3$ powder coated with silver as obtained by Preparation Example 1 was dispersed in 30 ml. of a 3 percent toluene solution of polystyrene, and coated on a foil of aluminum in thickness of about 10 microns (after dried). The resulting photosensitive plate was exposed at the same condition as Example 1, and as the result, the electric resistance of the exposed portion decreased remarkably and a resistance pattern was formed. This plate may be utilized as an electrostatic printing plate.

In this Example, CdS powders were treated in a way similar to Preparation Example 1 to produce CdS powders coated with silver (15mg. Ag per 1g. CdS). The resulting CdS powders (1g.) was dispersed in a 3 percent solution of polystyrene in toluene and coated on an aluminum foil in thickness of about 10 microns. The resulting photosensitive plate was exposed under the same condition as in Example 1 above to form a visible image of low optical density at the exposed portion.

EXAMPLE 3

As, S and I were mixed at a ratio of 2:3:1/10 (atomic ratio) and melted in a quartz tube at 300°C. After cooling, the resulting alloy was ground by a ballmill scattered on a glass plate (10g./100cm$^2$) and heated in an electric furnace at 150°C. A photosensitive layer having rough surface was formed on the glass plate. The plate was soaked in an aqueous ammoniac silver nitrate solution in the dark for three hours, washed with water and dried to form a photosensitive plate. When glucose was added to an aqueous ammoniac solution of silver nitrate, the chalcogen layer was converted to a photosensitive one in about 10 minutes. A brown image was obtained by exposing the resulting photosensitive plate to a light pattern in a way similar to in Example 1. When the photosensitive plate thus exposed was soaked in a 3 percent solution of ferric nitrate for three minutes, the back ground was not changed any more by a light, i.e. fixed.

EXAMPLE 4

Various chalcogen glass powders coated with Ag by the method of Example 1 were dispersed in gelatine and coated on a glass plate to form photosensitive plates. The exposure time was measured which is necessary to obtain 0.10 of density difference between the image and the background when exposure is effected with a 500 W xenon lamp at a distance of 30 cm. The result is shown in the following table. The sensitivity was shown by a reciprocal of an exposured time.

| Sample No. in Preparation Example 2 | Sensitivity |
|---|---|
| 1 | 110 |
| 2 | 300 |
| 3 | 800 |
| 4 | 2000 |
| 5 | 1500 |
| control | 100 |

The control is a photosensitive plate produced by coating $As_2S_3$ of 2.0 microns in thickness and Ag of 30 millimicrons in thickness an a glass plate successively, and the sensitivity was assumed to be 100.

EXAMPLE 5

In 100ml. of a 5 percent aqueous solution of gelatine was dispersed 0.10 g of arsenic trisulfide and a 4 percent aqueous solution of NaOH was added to the above solution with stirring at 40°C until the arsenic trisulfide was dissolved completely. The temperature was then decreased to 35°C, and a 4 percent acetic acid was gradually added until pH of the above solution become 4.5 to give a colloidal solution of arsenic trisulfide. Then 0.5g of ascorbic acid was added with stirring and 10ml. of a 3 percent aqueous solution of $AgNO_3$ was added. After stirring for an hour, the above solution was cooled, gelated, cut, and washed with water. The resulting gel was dissolved by heating, coated on a glass plate having a gelatine undercoating, cooled set, and dried by hot air. The above treated glass plate was exposed to a xenon lamp through an original, and subjected to a physical development by using the following Solution A and Solution B. The composition of the Solution A and the Solution B are as shown below.

Composition of Solution A

| | |
|---|---|
| Metal | 8.3g. |
| Citric acid | 8.3g. |
| Acetic acid | 4.2g. |
| Gelatine | 0.9g. |
| Water | Q.S. to 1 litre |

Composition of Solution B

| | |
|---|---|
| Silver nitrate | 30g. |
| Water | Q.S. to 45 ml. |

In this Example, 50 ml. of Solution A and 1 ml. of Solution B were mixed just before using.

After the physical development, the plate was treated (fixed) with a 4 percent solution of NaOH for three minutes, washed with water and dried. As a result, a positive black pattern of D max 1.7 and D min 0.11 was obtained.

EXAMPLE 6

To 100 ml. of an 8 percent aqueous solution of water-soluble acrylic resin and Carboset 525(supplied by Goodrich Chemical Co.) was added 2 ml. of a 5 percent aqueous solution of lead iodide, and then 25 ml. of isoprophyl alcohol was added with stirring. To the light yellow turbid solution thus obtained was added 1 ml. of a 1 percent aqueous solution of silver nitrate, and a solution of hydroquinone (0.1g) in 10 ml. of water was added and stirred for two hours. Temperature of the solution was maintained at 35°C, and the pH was maintained at about 8.0 by adding aqueous ammenia.

The solution was coated on a hydrophilic polyester film to form a thin film of 5 microns in thickness (after dried) and dried at a temperature up to 70°C. The resulting film was exposed to a xenon lamp and treated with a solution of physical development (as used in Example 5) and washed with water to produce a light yellow back ground and a black positive image. D max was 2.0 and D min was 0.30.

What is claimed is:

1. A photosensitive member useful for providing a member having an image pattern by utilizing diffusion of a metal upon exposure to light into an inorganic compound capable of photooxidizing the metal, which comprises a photosensitive layer uniformly containing photosensitive particles comprising the metal coated on the surface of particles of the inorganic compound, the photosensitive particles ranging in size from 0.01 to 20 microns and having the metal in the ratio of 0.01–50 parts by weight per 100 parts by weight of the inorganic compound, the metal being selected from the group consisting of Ag, Cu, and alloys containing Ag, Cu or both of Ag and Cu, and the inorganic compound being selected from the group consisting of a chalcogen glass, which contains a sulfur family element selected from the group consisting of S, Se and Te in the form of glass, and a crystallized metal compound, which includes CuI, $PbI_2$, $PbCl_2$, $CdCl_2$, CuCl, $SbI_3$, PbS and PbSe.

2. A method for the production of an image pattern having metal-diffused portions at exposed areas, which comprises imagewise exposing a photosensitive member which comprises a photosensitive layer uniformly containing photosensitive particles, said particles comprising a particulate inorganic compound having a surface coating of a metal, said photosensitive particle ranging in size from 0.01 to 20 microns and having the metal in the ratio of 0.01–50 parts by weight to 100 parts by weight of the inorganic compound, the metal being selected from the group consisting of Ag, Cu, and alloys containing Ag, Cu or both of Ag and Cu, and the inorganic compound being selected from the group consisting of a chalcogen glass, which contains a sulfur family element selected from the group of S, Se and Te in the form of glass, and a crystallized metal compound, which includes CuI, $PbI_2$, $CdCl_2$, CuCl, $SbI_3$, PbS and PbSe.

3. A method for the production of an image pattern having metal-diffused portions at exposed areas, which comprises imagewise exposing a photosensitive member which comprises a photosensitive layer containing photosensitive particles, said particles comprising a particulate inorganic composition having a surface coating of a metal, said inorganic composition being capable of photooxidizing said metal, the photosensitive particles ranging in size from 0.01 to 20 microns and having the metal in the ratio of 0.01–50 parts by weight per 100 parts by weight of the inorganic compound, the metal being selected from the group consisting of Ag, Cu, and alloys containing Ag, Cu or both of Ag and Cu, and the inorganic compound being selected from the group consisting of a chalcogen glass, which contains a sulfur family element selected from the group consisting of S, Se and Te in the form of glass, and a crystallized metal compound, which includes CuI, $PbI_2$, $PbCl_2$, $CdCl_2$, CuCl, $SbI_3$, PbS and PbSe, said photosensitive particles being uniformly dispersed in a hydrophilic binder resin and then applying a physical development to the exposed layer to form a positive image pattern.

4. A method for the production of an image pattern having metal-diffused portions at exposed areas, which comprises imagewise exposing a photosensitive member which comprises a photosensitive layer containing photosensitive particles, said particles comprising a particulate inorganic composition having a surface coating of a metal, said inorganic composition being capable of photooxidizing said metal, the photosensitive particles ranging in size from 0.01 to 20 microns and having the metal in the ratio of 0.01–50 parts by weight per 100 parts by weight of the inorganic compound, the metal being selected from the group consisting of Ag, Cu, and alloys containing Ag, Cu or both of Ag and Cu, and the inorganic compound being selected from the group consisting of a chalcogen class, which contains a sulfur family element selected from the group consisting of S, Se and Te in the form of glass, and a crystallized metal compound, which includes CuI, $PbI_2$, $PbCl_2$, $CdCl_2$, CuCl, $SbI_3$, PbS and PbSe, said photosensitive particles being uniformly dispersed in a hydrophilic binder resin and then treating with an acid solution.

5. A method for the production of an image pattern having metal-diffused portions at exposed areas, which comprises imagewise exposing a photosensitive member which comprises a photosensitive layer containing photosensitive particles, said particles comprising a particulate inorganic composition having a surface coating of a metal, said inorganic composition being capable of photooxidizing said metal, the photosensitive particle ranging in size from 0.01 to 20 microns and having the metal in the ratio of 0.01–50 parts by weight per 100 parts by weight of the inorganic compound, the metal being selected from the group consisting of Ag, Cu, and alloys containing Ag, Cu or both of Ag and Cu, and the inorganic compound being selected from the group consisting of a chalcogen class, which contains a sulfur family element selected from the group consisting of S, Se and Te in the form of glass, and a crystallized metal compound, which includes CuI, $PbI_2$, $PbCl_2$, $CdCl_2$, CuCl, $SbI_3$, PbS and PbSe, said photosensitive particles being dispersed in a hydrophilic binder resin and then treating with an alkali solution.

6. A photosensitive member according to claim 1 in which the photosensitive layer is composed of photosensitive particles uniformly dispersed in a binder resin.

7. A photosensitive member according to claim 6 in which the binder resin is a hydrophilic binder resin.

8. A method for forming an image pattern according to claim 3 in which after applying the physical development, an alkali solution treatment is conducted to form a positive image pattern.

9. A method for forming an image pattern according to claim 4 in which after treating with an acid solution, an alkalai solution treatment is conducted.

10. A method for forming an image pattern according to claim 5 in which after treating with an alkali solution, physical development is conducted.

* * * * *

UNITED STATES PATENT OFFICE
CERTIFICATE OF CORRECTION

Patent No. 3,907,566 Dated September 23, 1975

Inventor(s) EIICHI INOUE, ET AL

It is certified that error appears in the above-identified patent and that said Letters Patent are hereby corrected as shown below:

The Abstract , Lines 4-5, change "layer containing uniformly a photosensitive particle" to read --layer uniformly containing photosensitive particles--

Line 6 and 9, in each instance, change "particle" to read --particles--

Line 7, change "alloy" to read --alloys--

Column 1, Lines 32-33, change "such kind of photosensitive member as above" to read --such photosensitive members--

Line 44, change "molted" to read --molten--

Line 61, change "chalcogne" to read --chalcogen--

Column 2, Line 26, change "amouont" to read --amount--

Line 47, change "containing uniformly a photosensitive particles" to read --uniformly containing photosensitive particles--

Line 48, change "particle" to read --particles--

Line 50, change "alloy" to read --alloys--

Line 56, delete "a pattern by using" first occurrence

UNITED STATES PATENT OFFICE
CERTIFICATE OF CORRECTION

Patent No. 3,907,566 Dated September 23, 1975

Inventor(s) EIICHI INOUE, ET AL

It is certified that error appears in the above-identified patent and that said Letters Patent are hereby corrected as shown below:

Column 3, Line 24, change "pheol" to read --phenol--

Column 4, Line 46, change "particle" to read --particles--

Line 47, change "chlcogen" to read --chalcogen--

Line 49, insert "Preparation" between "in" and "Examples"

Line 65, delete "if"

Column 5, Line 3, change "$Ascl_3$" to read --$AsCl_3$--

Line 33, change "sufficient" to read --necessary--

Column 6, Line 10, change "Cul" to read --CuI--

Line 11, change "$Pbl_2$" and "$Sbl_3$" to read, respectively, to read --$PbI_2$-- and --$SbI_3$--

Column 7, Lines 15 and 34, in each instance, change "only" to read --simply--

Line 54, "present inner" to read --present in the inner--

Column 8, Line 66, "tricklene" to read --trichlene--

Column 9, Line 11, change "An " to read --The--

Line 12, change "usually. And aqueous of" to read --usually and aqueous or--

Line 46, change "posed of the said plate portion"

UNITED STATES PATENT OFFICE
CERTIFICATE OF CORRECTION

Page 3

Patent No. 3,907,566 Dated September 23, 1975

Inventor(s) EIICHI INOUE, ET AL

It is certified that error appears in the above-identified patent and that said Letters Patent are hereby corrected as shown below:

to read --posed portion of the said plate--

Column 11, Line 35, change "isoprophyl" to read --isopropyl--

Line 41, change "ammenia" to read --ammonia--

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*